Aug. 11, 1970   A. N. OPENSHAW ET AL   3,523,450
TIRE PRESSURE INDICATORS

Filed April 4, 1968   2 Sheets-Sheet 1

INVENTORS
ALEXANDER N. OPENSHAW
CHARLES K. OGILVIE
ALVIN E. JOSLIN

BY: *W. Britton Moore*
ATTORNEY

United States Patent Office 3,523,450
Patented Aug. 11, 1970

3,523,450
TIRE PRESSURE INDICATORS
Alexander N. Openshaw, 36 Kinghigh Drive, Concord, Ontario, Canada; Charles K. Ogilvie, 24 Abitibi Ave., Willowdale, Ontario, Canada; and Alvin E. Joslin, 1559 Elite Drive, Clarkson, Ontario, Canada
Filed Apr. 4, 1968, Ser. No. 718,688
Int. Cl. B60c 23/04
U.S. Cl. 73—146.5                                8 Claims

ABSTRACT OF THE DISCLOSURE

A pressure-responsive device for providing an electrical signal indicative of the pressure of a body of fluid material and especially suited for providing a signal indicative of the air pressure within a pneumatic tire comprises a chamber bounded in part by a resilient diaphragm. A contact arm usefully having a helical configuration is mounted on the diaphragm so as to be angularly disposed with respect to an electrically resistive disc. As the pressure within the chamber varies with the tire pressure, the extent to which the contact arm engages the resistive disc varies so as to provide a variable resistance value between the contact arm and a terminal point on the disc.

Figure 1:
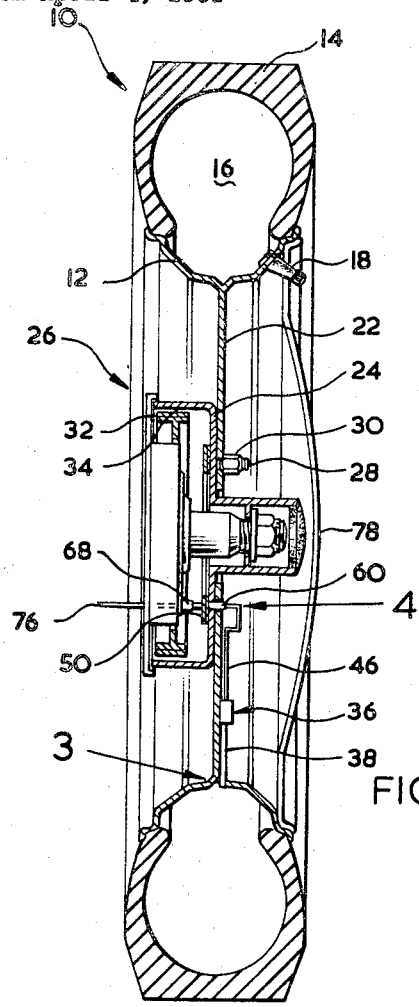

The present invention relates to a device for providing an indication of the pressure within the gaseous envelope of a pneumatic tire disposed on the rim of a rotatable wheel. More particularly, the invention relates to a device which provides an indication when the pressure within a pneumatic tire has deviated from a preselected value or from a preselected range of values.

Many devices are already known which can be used to indicate to the operator of a vehicle the pressures within the tires of the vehicle or deviation of such pressures from predetermined values. Such known devices have, however, presented certain disadvantages. For instance, some of the known devices are unreliable since they are easily damaged during operation of the vehicle, for example, by dirt or moisture or by wear of relatively moving component parts. Other known devices have the disadvantage that they have a complex construction and are consequently expensive both to purchase and to service. Many of the known devices also have the very serious disadvantage that they seriously complicate any wheel-changing operation.

It is a primary object of the present invention to provide a device for giving an indication of the pressure within the gaseous envelope of a pneumatic tire, which device is relatively simple and rugged in its construction and which does not seriously complicate any wheel-changing operation.

Other objects and advantages of the present invention will become readily apparent as the description proceeds.

In its broadest scope, the present invention provides a device for providing an indication of the pressure within the pneumatic tire disposed on the rim of a rotatable wheel, said wheel being detachably mounted on the outer surface of a wheel-mounting plate, and said device comprising:

(a) a pressure-actuated means in pressure communication with said gaseous envelope, mounted on said wheel and having an electrical parameter value which is a function of said pressure within said envelope;
(b) an electrical conductor in electrical connection at one of its extremities with said pressure-actuated means and terminating at its other extremity in a first terminal element;
(c) a signal-transfer unit disposed to the rear of said mounting plate, comprising a relatively rotatable commutator and brush and adapted to transfer continually an electrical parameter value between said commutator and said brush;
(d) a second terminal element electrically connected to said signal-transfer unit;
(e) aligned apertures in said wheel and said wheel-mounting plate permitting ready access to said second terminal element; and
(f) circuit means electrically connected to said signal-transfer unit for providing an indication of said pressure within said gaseous envelope of said tire;

said first terminal element and said second terminal element being adapted to be connected electrically together and to be detachable readily from each other to permit said wheel to be removed readily from said wheel-mounting plate.

It will be noted that the expression "providing an indication of the presusre" has been used herein. It should be understood that, when this expression is used herein and in the appended claims, it is intended to embrace both the provision of an actual numerical value of the pressure within the gaseous envelope of a tire and the provision of a signal indicating that the pressure within the tire has deviated from a preselected value or preselected range of values. It also embraces the provision of such a signal only when the pressure within the tire has fallen below a preselected value and the provision of no such warning signal which, by its absence, will indicate that the pressure has not so deviated.

In a preferred construction, the aforementioned wheel-mounting plate forms part of a brake-drum assembly and the commutator is mounted on the rear surface of the wheel-mounting plate for rotation therewith, but is insulated therefrom. An advantage of this particular construction is that the brush and commutator are disposed within the brake drum assembly and so are protected against dust and dirt. The brush may easily be replaced by removing the brake drum or, if desired, a bushing may be provided in the rear of the brake assembly so that the brush can be replaced without removing the brake drum itself.

In a particularly useful construction, the aforementioned second terminal element comprises a female socket electrically connected to the commutator and projecting through aligned apertures in the wheel and the wheel-mounting plate, and the first terminal element comprises a male plug adapted to be disposed removably within the female socket. Such a female socket may, if desired, be integrally formed with said commutator.

The pressure-actuated means may be in pressure communication with the gaseous envelope of the tire by means of a flexible hose adapted to be secured removably to the existing valve stem of the pneumatic tire. With this arrangement, the flexible hose will have means for opening the valve within the valve stem when the hose is secured on the valve stem. Alternatively, the pressure-actuated means may be in pressure communication with the gaseous envelope of the tire by means of a tube passing through the rim of the wheel. This construction is particularly useful in the case of wheels fitted with the so-called tubeless tires.

As hereinbefore indicated, the pressure-actuated means which is in pressure communication with the gaseous envelope of the pneumatic tire has an electrical parameter value which is a function of the pressure within the envelope. As will be explained in greater detail hereinfater, the pressure-actuated means may be a switch or a variable resistor. It should here be noted that a switch can be considered to have two limiting values of the resistance parameter, namely, a very high resistance when open and a relatively low resistance when closed. In other con-

3 structions, the electrical parameter utilized could be capacitance, inductance, etc.

In a particularly useful and simple construction for the devices of the invention, the pressure-activated means comprises a pressure-actuated switch which is closed when the pressure within the gasous envelope deviates from a pre-selected value or from a preselected range of values. In another useful and even simpler construction, the pressure-actuated means may comprise a pressure-actuated switch which is closed only when the pressure within the gaseous envelope falls below a preselected value. With such switch-actuated devices, the circuit means can be adapted to provide a visual and/or an audible warning when such a pressure-actuated switch is closed.

In one form for the circuit means, the latter includes both a warning lamp and an audible warning device in series connection with each other and each shunted by a resistor whereby on deviation of the pressure within the gaseous envelope from a preselected value or from a preselected range of values, actuation of the warning lamp and the audible warning device occurs and, in the event of operational failure of one of these warning devices, the other is still actuated.

Figure 2:
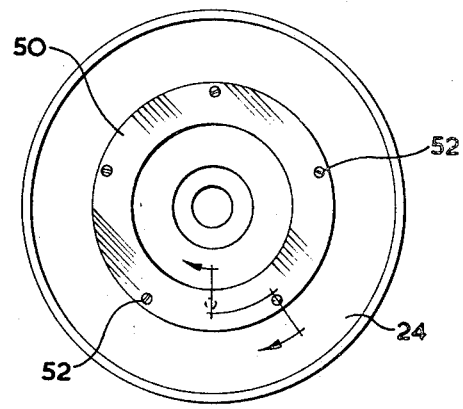
Figure 4:
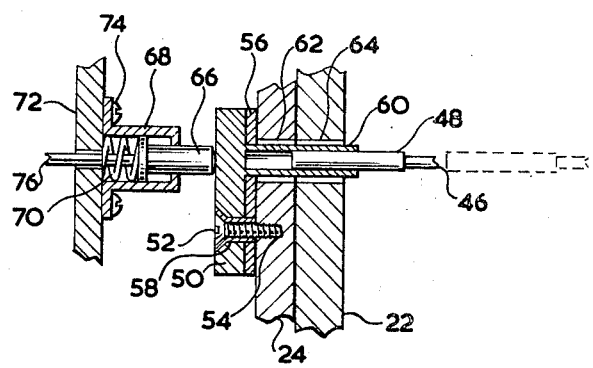
Figure 3:
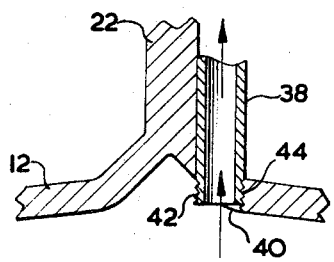
Figure 5:
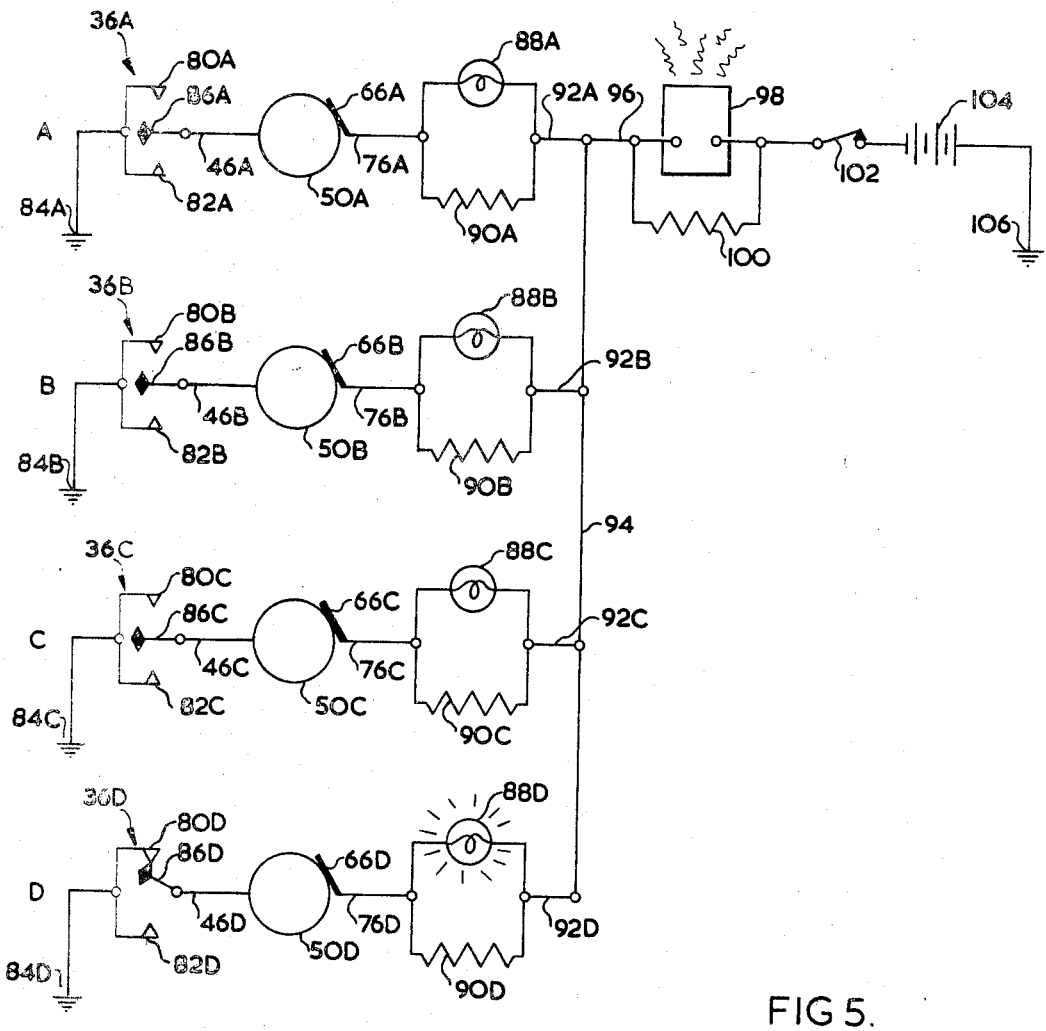
Figure 6:
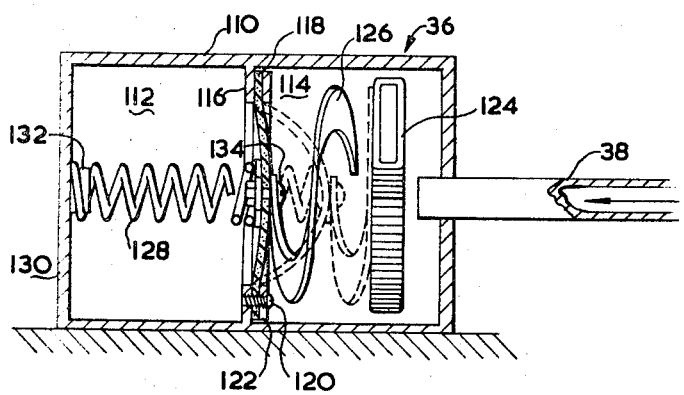

The invention will now be described merely my way of illustration with reference to the accompanying drawings in which:

FIG. 1 is a vertical section through a wheel fitted with a pneumatic tire and equipped with a device in accordance with the invention, FIG. 2 is an inner elevational view of the brake drum of the wheel of FIG. 1 showing the commutator of the device mounted thereon;

FIG. 3 is a fragmentary enlarged sectional view through the rim of the wheel ard the tube by means of which the pressure-actuated means is in pressure communication with the gaseous envelope of the tire, at the location identified by the arrow 3 in FIG. 1, FIG. 4 is an enlarged fragmentary sectional view through the signal-transfer unit at the location identified by the arrow 4 in FIG. 1, FIG. 5 is a wiring diagram illustrating in a schematic manner one useful way in which the devices of the invention may be used to provide an indication of the tire pressure for any of four wheels of a vehicle; and FIG. 6 is a section through one type of pressure-actuated means which can be used in a device in accordance with the invention.

It will be seen from FIGS. 1 to 4 of the drawings that the device illustrated is mounted on a wheel generally indicated at 10 and having a rim 12. In the embodiment illustrated, the rim 12 is fitted with a pneumatic tire 14 having a gaseous envelope 16. The tire 14 is provided with a conventional valve stem 18 containing a filling valve (not shown). The wheel 10 also has a vertical wheel plate 22. It will be appreciated as the description proceeds that the invention is not restricted to wheels having such plates and is equally applicable to a wheel in which a rim is secured to a hub piece by means of spokes or other radially extending members.

In the embodiment illustrated, the wheel 10 is secured to a wheel-mounting plate 24 of a brake drum assembly generally indicated at 26 by studs 28 and nuts 30. Since the axle on which the wheel is supported can be of any construction and since such construction forms no part of the present invention, a detailed description of such construction is omitted herefrom. It should, however, be noted that, in the structure of FIG. 1, there are provided brake shoes 32 which co-operate with the inner peripheral surface 34 of the brake drum 26 for the purpose of stopping or preventing rotation of the wheel 10.

It will further be appreciated that the vertical plate 24 of the brake drum assembly 26 comprises the wheel-mounting plate hereinbefore mentioned.

4

Reference will now be made to the other component parts of the device of the invention. The component generally indicated at 36 is a pressure-actuated means, the operation of which will be described in greater detail hereinafter. It is sufficient to state at this time that the pressure-actuated means 36 serves to provide an electrical parameter value which is a function of the pressure within the gaseous envelope 16 of the tire 14. It should perhaps also be added that this component will normally be disposed as close as possible to the hub of the wheel to avoid disturbing the balance of the wheel.

As will be seen from FIG. 1, the pressure-actuated means 36 is in pressure communication with the gaseous envelope 16 by means of a tube 38 extending from the means 36 to a hole 40 in the rim 12. It will be appreciated that the tube 38 must be in a gas-tight relationship with the rim 12 to prevent any loss of pressure from within the tire 14. Such a gas-tight relationship may be obtained by providing co-operating threads 42 and 44 on the end of the tube 38 and on the inner surface of the hole 40 respectively as shown in FIG. 3.

The provision of the tube 38 in the manner illustrated is particularly satisfactory in the case of wheels fitted with tubeless tires but it should be realized that the pressure-actuated means 36 may be placed in pressure communication with the gaseous envelope 16 in any other suitable manner, for instance, by means of a flexible hose which can be removably connected to the valve stem 18. It will further be appreciated that, if the pressure-actuated means 36 is connected to the valve stem 18 by means of a flexible hose, such a hose will need to be provided at its end with an axially-disposed valve-opening pin to open the tire-filling valve to permit in turn unobstructed pressure communication between the pressure-actuated means 36 and the gaseous envelope 16.

The pressure-actuated member 36 is secured to the wheel 10 in any convenient manner (not shown) and numerous methods for doing this will be obvious to those skilled in the art. The electrical parameter value provided by the pressure-actuated means 36 is "carried" by an electrical conductor 46 terminating at its free end in a first terminal element 48. It will be seen from FIG. 4 that, in the embodiment illustrated, the first terminal element 48 is in the form of a male plug or jack.

It will also be noted that an annular commutator ring 50 is mounted on but insulated from the rear surface of the wheel-mounting plate 24. The commutator ring 50 is mounted by means of screws 52 received in threaded holes 54 provided in the rear surface of the wheel-mounting plate 24. In order to insulate the commutator ring 50 from the plate 24, an insulating layer 56 is provided between the commutator ring 50 and the plate 24 and each of the screws 52 is surrounded by an insulating sleeve 58. Electrically connected to the commutator ring 50 is a second terminal element which, in the embodiment illustrated, comprises a female socket member 60 integrally formed with the commutator ring 50. The female socket member 60 extends through a hole 62 provided in the wheel-mounting plate 24 and through an aligned hole 64 provided in the wheel plate 22. It will be understood that the female socket member 60 must be electrically insulated from the plates 24 and 22 and this can be effected by providing insulating material between the outer surface of the female socket member 60 and the inner surfaces of the holes 62 and 64. Alternatively, as shown in the drawings, the holes 62 and 64 may be sufficiently wide to prevent electrical contact between the plates 24 and 22 on the one hand and the female socket member 60 on the other hand. The female socket member 60 is adapted to receive the male plug 48 as shown in solid lines in FIG. 4.

The hereinbefore described commutator ring 50 comprises part of the signal-transfer unit. This latter unit is completed by a brush 66 suitably retained in a housing 68 and urged against the commutator ring 50 by a helical compression spring 70. The housing 68 is secured to a fixed part of the axle housing in any convenient manner and, in the embodiment illustrated, it is secured to a plate 72 of insulating material by means of screws 74. The plate 72 is then in turn secured by screws (not shown) to the axle housing. An electrical conductor 76 is connected to the brush 66. This conductor 76 serves to transfer an electrical parameter value to circuit means for providing an indication of the pressure within the gaseous envelope 16 of the tire 10. Before considering how such indication can be effected, the steps involved in replacing a wheel on the vehicle will be briefly described. All that is necessary for doing this is to remove the plug 48 to the position shown in broken lines in FIG. 4 from the socket 60 by pulling on the former. The wheel 10 can then be removed by unscrewing the nuts 30 from the studs 28 in the conventional manner, after first removing the hub cap 78. After a replacement wheel has been placed in position with its hole 64 aligned with the hole 62, as will automatically be ensured when the replacement wheel is correctly disposed on the studs 28, the nuts 30 are screwed tightly on to the studs 28 and the plug 48 of the replacement wheel is inserted into the female socket member 60. It will be noted that the provisions of a device for providing an indication of the pressure within the gaseous envelope of a pneumatic tire in accordance with the invention does not significantly affect such a wheel-changing operation. If the pressure-actuated means 36 is of a type which can be readily removed from a wheel as will frequently be the case if it is connected to the gaseous envelope 16 by means of a flexible hose coupled to the valve stem 18 in the hereinbefore described manner, it will then be possible to remove the pressure-actuated means 36 complete with its hose, conductor 46 and plug 48 from the wheel being removed and to connect it to the replacement wheel being fitted.

The pressure-actuated means 36 has hereinbefore been referred to as a device capable of providing an electrical parameter value which is a function of the gaseous pressure within the gaseous envelope 16. Many systems to which such devices can be connected to provide an indication of the tire pressure to the vehicle operator are already known and, in its broadest scope, the invention embraces the use of any such system or circuit means.

Such circuit means may, for instance, comprise an electrical meter calibrated directly in units of pressure and such a meter can then indicate the actual pressure in the gaseous envelope of the pneumatic tire. If it is desired to provide an indication of the gaseous pressure in each of a plurality of pneumatic tires on a vehicle, such a meter may be provided for each such tire. Alternatively, a single meter may be provided in the circuit means and may be adapted to provide successively and periodically an indication of the pressure within each tire. Such periodic operation may be effected automatically or manually by the vehicle operator. Furthermore, the circuit means may be adapted to provide a printed record of the gaseous pressures within the tires of the vehicle.

It will be appreciated that the aforementioned circuit means may not include any meter means for indicating actual pressure values but may simply contain indicating devices such as visual and/or audible alarms which are actuated when the pressure in any tire deviates from a preselected value or from a preselected range of values.

The electrical parameter value of the pressure-actuated means 36 which is a function of the gaseous pressure within the gaseous envelope 16 will be selected from such parameters as resistance, capacitance, reluctance and inductance. It may be mentioned, merely by way of example, that the pressure-actuated means 36 may comprise a variable resistor, the movable contact of which is positioned by means of a pressure-controlled member such as a piston or bellows lever. Many such devices are known to those skilled in the art and it is considered unnecessary to describe such a device in detail herein. If the pressure-actuated means comprises such a variable resistor, the circuit means may simply comprise an ammeter connected in series with a voltage source which may conveniently be the electric storage battery of the vehicle's existing electrical system. In such an arrangement, the second terminal of the ammeter may be connected to the brush 66 of the signal-transfer unit through which the ammeter will then be connected to one terminal of the variable resistor of the pressure-actuated means 36. The other terminal of the variable resistor can then be "grounded" to the chassis of the vehicle so completing the electrical circuit back to the grounded terminal of the battery. It will be appreciated that, in such an arrangement, the electrical parameter value transferred by the signal-transfer device can be considered to be the actual resistance of the variable resistance in the pressure-actuated means 36 even though the variable parameter passing through the signal-transfer device is the current flowing therethrough.

In an alternative construction, the pressure-actuated means 36 may comprise a pressure-actuated single-pole, double-throw switch. Such a pressure-actuated switch is adjusted so that, when the pressure in the gaseous envelope of the pneumatic tire is at a desired preselected value or is within a desired preselected range of values, the switch is in its neutral or open position but, when the pressure in the gaseous envelope deviates from such a preselected value or from such a preselected range of values, the switch is closed. Such closing of the switch can then be used to actuate an alarm or indicator in the circuit means. A particularly useful circuit means for use with such a pressure-actuated switch is shown schematically in FIG. 5 of the accompanying drawings in combination with devices for providing an indication of the pressure within each of four tires of a vehicle. The devices for each of these tires are generally indicated at A, B, C and D in FIG. 5 and corresponding component parts are numbered identically as in FIGS. 1 to 4 except that suffixes A, B, C and D are appended to the numbers.

Each of the pressure-actuated means 36A, 36B, 36C and 36D is shown as comprising two separated fixed contacts, 80A and 82A, 80B and 82B, 80C and 82C, and 80D and 82D respectively. These contacts are all grounded as at 84A, 84B, 84C and 4D to the chassis of the vehicle, for example, through the wheel, the axle bearing and the wheel axle. Each of the pressure-actuated switches 36A, 36B, 36C and 36D also comprises a movable contact arm 86A, 86B, 86C and 86D respectively, the positions of which are determined by means (not shown) in accordance with the pressures within the respective tires. The switches 36A, 36B, 36C and 36D are adjusted so that, when the pressure in the tire is at the desired value, the respective movable contact arm is in its neutral or open position as shown for the devices A, B and C. If, however, the pressure within the tire has deviated from the desired value, the movable contact arm of the switch is moved so that it makes contact with one of the fixed contacts as shown for the device D in FIG. 5. Merely by way of example, it can be explained that, if the pressure in the tire is too low, the movable contact will make contact with one of the fixed contacts, for instance, movable contact 86D will contact fixed contact 80D. If, on the other hand, the pressure in the tire is too high, the movable contact will contact the other fixed contact, for instance, the movable contact 86D will contact the fixed contact 82D.

With further reference to FIG. 5, it will be noted that each movable contact 86A, 86B, 86C and 86D is connected by an electrical conductor 46A, 46B, 46C and 46D respectively to a commutator ring 50A, 50B, 50C and 50D respectively. The brushes 66A, 66B, 66C and 66D are each connected by an electrical conductor, 76A 76B, 76C and 76D respectively to one terminal of an inductor lamp 88A, 88B, 88C and 88D respectively. Each of these lamps is shunted, for a purpose which will be explained hereinafter, by a resistor 90A, 90B, 90C and 90D respectively.

The second terminals of the lamps 88A, 88B, 88C and 88D are connected by electrical conductors 92A, 92B, 92C and 92D respectively and by electrical conductors 94 and 96 to one terminal of an electrical audible warning device such as a buzzer 98, which is shunted by a resistor 100. The second terminal of the buzzer 98 is connected through a switch 102 to one terminal of a suitable voltage source 104 which has its other terminal grounded as at 106 to the chassis of the vehicle. It will be appreciated that the voltage source 104 may comprise the existing battery of the vehicle's electrical system and that switch 102 can be the ignition switch for the engine of the vehicle.

Since the pressure in the tire of device D is below the desired value and since switch 36D is consequently closed, the circuit through lamp 88D and buzzer 98 is completed. Consequently, both lamp 88D and buzzer 98 are actuated to alert the operator of the vehicle to the undesirable condition of the tire. In the event of operational failure of any of the lamps 88A, 88B, 88C and 88D, the buzzer 98 will still be actuated when one of the switches 36A, 36B, 36C and 36D is closed since the circuit will then be completed through the relevant lamp-shunting resistor 90A, 90B, 90C or 90D. Similarly, in the event of operational failure of the buzzer 98, the relevant lamp will still be lit as the circuit will then be completed through the buzzer-shunting resistor 100. In addition, actuation of a lamp without the buzzer or of the buzzer without a lamp will immediately indicate to the operator that one of the components has failed and should be replaced.

The pressure-actuated variable resistor/switch shown in FIG. 6 is another example of a suitable construction for the pressure-actuated means 36 used in the device of the invention. The resistor/switch shown in FIG. 6 comprises a housing 110 divided into two chambers 112 and 114 separated by a flexible diaphragm 118 secured to an internal radial flange 116 by means of a clamping ring 122 and screws 120. A circular exposed wire resistor 124 is mounted in chamber 114 by means not shown and has one of its terminals electrically connected to the electrical conductor 46. The chamber 114 is in gaseous communication with the gaseous envelope 16 of the tire 14 through tube 38 so that the pressure in the chamber 114 is substantially equal to that within the envelope 16. As S-shaped spring metal contact arm 126 is secured in an air-tight manner to the diaphragm 118 and is urged towards the resistor 124 by a helical spring 128 disposed within the chamber 112 between the diaphragm 118 and the end wall 130 of the air-tight chamber 112. The end wall 130 is provided with a stud 132 to prevent radial slipping of the spring 128.

If the gaseous pressure within the gaseous envelope 16 of the tire 14 is at least equal to a preselected value, the diaphragm 118 is urged away from the resistor 124 so that the contact arm 126 does not make contact therewith (solid line position of FIG. 6). If, on the other hand, the pressure within the gaseous envelope 16 of the tire 14 falls below the pre-selected value, the air pressure exerted on the diaphragm 118 is correspondingly reduced and the contact arm 126 moves under the influence of spring 128 towards the resistor 124, as shown, by way of example, in the broken line position of FIG. 6. In this event, a circuit is completed through the electrical conductor 46, the resistor 124, the contact arm 126, the helical spring 128 to which the contact arm is electrically connected by bolt 134, and the housing 110 to the chassis of the vehicle. It will be appreciated that, if the air pressure within the gaseous envelope 16 of the tire 14 falls even lower, the contact arm 126 will move so as to contact the resistor 124 at a different peripheral position and that consequently the resistance connected in the indicating circuit will be altered. In this way, the device of FIG. 6 may be utilized to provide an electrical signal indicative of the extent to which the pressure within the gaseous envelope 16 of the tire 14 has fallen below a predetermined value.

If the pressure-actuated resistor/switch 36 of FIG. 6 is utilized in the circuit of FIG. 5 instead of the single-pole double-throw switches shown therein, the current flowing through the corresponding lamp 88 and through the buzzer 98 will depend on the extent to which the tire pressure has fallen below said preselected value. It will readily be apparent that such resistor/switches 36 can be used in conjunction with signal lamps of the type which commence to flash when the current flowing through them reaches a certain value.

What we claim is:

1. A pressure-responsive device for providing an electrical signal indicative of the pressure of a body of fluid material, which device comprises:
   a chamber adapted to be disposed in fluid communication with said body of fluid material;
   a resilient diaphragm constituting a wall portion of said chamber and responsive to fluid pressure therewithin;
   an electrically conductive contact arm carried by said diaphragm and extending therefrom for conjoint movement therewith on variation of said pressure of said flrid material;
   an electrically resistive member angularly disposed with respect to said electrically conductive contact arm for electrical contact therewith along a length of said contact arm which is dependent on said pressure of said fluid material said electrically conductive contact arm being adapted to be spaced apart from said electrically resistive member when said pressure of said fluid material exceeds a predetermined value;
   a first electrical terminal means on said electrically conductive contact arm; and
   a second electrical terminal means on said electrically resistive member,
   whereby the electrical resistance between said first and second electrical terminal means is indicative of said pressure of said body of fluid material.

2. A pressure-responsive device as claimed in claim 1 in which said electrically conductive contact arm extends helically from said resilient diaphragm and in which said electrically resistive member comprises a generally planar member disposed substantially parallel to said resilient diaphragm and in which said generally planar member includes a generally annular contact zone for contact by said electrically conductive contact arm along a length of said contact arm which length is dependent on said pressure of said body of fluid material.

3. A pressure-responsive device as claimed in claim 2 in which said electrically conductive contact arm includes a generally planar surface for electrical contact with said generally annular contact zone of said electrically resistive member.

4. A pressure-responsive device as claimed in claim 1 which additionally includes a spring means adapted to urge said diaphragm against the action of said pressure of said fluid material in said chamber in turn to urge said electrically conductive contact arm towards said electrically resistive member.

5. A pressure-responsive device as claimed 4 for providing an electrical signal indicative of the pressure within a gaseous envelope of a pneumatic tire, which pressure-responsive device additionally includes air flow means for interconnecting said gaseous envelope of said pneumatic tire and said chamber of said pressure-responsive device.

6. A pressure-responsive device as claimed in claim 5 for providing an electrical signal indicative of the gaseous pressure within the gaseous envelope of a pneumatic tire disposed on a rim of a rotatable wheel, said wheel being detachably mounted on an outer surface of a wheel-mounting plate, which pressure-responsive device is mounted on said wheel and additionally comprises a signal transfer unit mounted on said wheel-mounting place, electrical connection means extending from said signal transfer unit to said first and second electrical terminal means of said pressure-responsive device, and circuit means electrically connected to said signal-transfer unit for providing an indication of said pressure within said gaseous envelope of said tire, said electrical connection means being electrically detachable from said signal transfer unit to permit said wheel to be removed readily from said wheel-mounting plate.

7. A pressure-responsive device as claimed in claim 6 in which said signal transfer unit is disposed rearwardly of said wheel-mounting plate and includes a relatively rotatable commutator and brush adapted to transfer continually an electrical parameter value between said commutator and said brush, in which said electrical connection means terminates remotely from said pressure-responsive device in a first terminal element, in which a second terminal element is electrically connected to said signal transfer unit, in which aligned apertures are provided in said wheel and said wheel-mounting plate to permit ready access to said second terminal element, and in which said first and second terminal elements are adapted to be connected electrically together and to be detachable readily from each other to permit said wheel to be removed readily from said wheel-mounting plate.

8. A pressure-responsive device as claimed in claim 7 in which said circuit means comprises an electrically operated signal means adapted to provide a signal in response to the flow of electrical current through said electrically conductive contact arm in excess of a predetermined value.

References Cited

UNITED STATES PATENTS

| | | | |
|---|---|---|---|
| 2,206,158 | 7/1940 | Budd | 73—146.5 XR |
| 2,729,712 | 1/1956 | Sprague | 340—58 XR |
| 2,966,650 | 12/1960 | Earnest | 340—58 XR |
| 3,370,459 | 2/1968 | Cescati | 73—146.5 |

DONALD O. WOODIEL, Primary Examiner

U.S. Cl. X.R.

340—58